United States Patent
Yu

(10) Patent No.: US 9,932,728 B2
(45) Date of Patent: Apr. 3, 2018

(54) FLUSH VALVE ASSEMBLY AND TOILET FLUSH SYSTEM INCORPORATING THE SAME

(71) Applicant: Defond Components Limited, Chai Wan, Hong Kong SAR (CN)

(72) Inventor: Kwok Chiu Yu, Hong Kong (CN)

(73) Assignee: DEFOND HOLDINGS (H.K.) CO. LIMITED, Chaiwan, Hong Kong (CN)

( * ) Notice: Subject to any disclaimer, the term of this patent is extended or adjusted under 35 U.S.C. 154(b) by 127 days.

(21) Appl. No.: 14/600,455

(22) Filed: Jan. 20, 2015

(65) Prior Publication Data
US 2016/0208471 A1   Jul. 21, 2016

(51) Int. Cl.
| E03D 1/06 | (2006.01) |
| E03D 1/35 | (2006.01) |
| E03D 5/02 | (2006.01) |
| E03D 5/10 | (2006.01) |
| E03D 5/01 | (2006.01) |

(52) U.S. Cl.
CPC .............. *E03D 1/35* (2013.01); *E03D 5/01* (2013.01); *E03D 5/024* (2013.01); *E03D 5/105* (2013.01)

(58) Field of Classification Search
CPC ......... E03D 1/141; E03D 1/144; E03D 1/302; E03D 1/304; E03D 1/306; E03D 1/33; E03D 1/35; E03D 1/36; E03D 2001/147; E03D 2001/148; E03D 3/04; E03D 3/08; E03D 3/12; E03D 5/024
USPC ... 4/313, 325, 367, 385, 398, 399, 401, 407, 4/415, 402, 386–387; 251/48–55, 23, 251/61.1
See application file for complete search history.

(56) References Cited

U.S. PATENT DOCUMENTS

| 2,867,820 A | * | 1/1959 | Gray | E03D 1/302 251/48 |
| 2,879,520 A | * | 3/1959 | Hollingsworth | E03D 1/304 4/398 |
| 3,029,444 A | * | 4/1962 | Zorzi | E03D 1/105 4/375 |
| 3,705,428 A | * | 12/1972 | Braswell | E03D 1/34 4/388 |
| 3,816,856 A | * | 6/1974 | Braswell | E03D 1/34 4/391 |
| 3,973,751 A | * | 8/1976 | Brugnoli | E03D 1/085 137/147 |

(Continued)

FOREIGN PATENT DOCUMENTS

WO   WO9600329   *   1/1996   .............. E03D 1/14

*Primary Examiner* — Erin Deery
*Assistant Examiner* — Nicholas Ros
(74) *Attorney, Agent, or Firm* — Leydig Voit and Mayer

(57) ABSTRACT

A flush valve assembly for use in a toilet tank that has a drain opening, a valve seat at the drain opening, and a valve member movable relative to the valve seat, together acting as a flush valve. The valve member has an internal chamber for containing water to reduce buoyancy of the valve member in water, so that the valve member may descend through water to reach the valve seat for sealing engagement with the valve seat. The valve member has an inlet for admitting water into the chamber, and an outlet for discharging water from the chamber. A toilet flush system includes the toilet tank, a tank refill mechanism for refilling the toilet tank with water, the flush valve assembly in the toilet tank, and an operating unit for operating the flush valve assembly.

24 Claims, 14 Drawing Sheets

(56) References Cited

U.S. PATENT DOCUMENTS

| | | | | |
|---|---|---|---|---|
| 5,392,470 | A | * | 2/1995 | Johnson .................. E03D 1/144 4/325 |
| 9,359,752 | B2 | * | 6/2016 | Le ........................... E03D 1/304 |
| 2009/0211009 | A1 | * | 8/2009 | Yen ......................... E03D 1/308 4/407 |
| 2013/0152293 | A1 | * | 6/2013 | Yu ........................... F15B 11/08 4/406 |

* cited by examiner

FLUSH VALVE ASSEMBLY AND TOILET FLUSH SYSTEM INCORPORATING THE SAME

BACKGROUND OF THE INVENTION

Electrical toilet flush systems are becoming increasingly popular, which invariably are powered by the mains power (via an AC/DC voltage adaptor) and/or incorporate a motor-driven flush valve. The mains power may not be available in a bathroom or the provision of mains power connection in a bathroom requires extra safety installation (e.g. use of an earth leakage circuit breaker). The installation of a motor-driven flush valve can be relatively complicate and/or expensive, as it often involves the use of a speed-reduction gearbox. In general, manual override is not always possible, and this can be rather inconvenient in the case of power failure.

The invention seeks to mitigate or to at least alleviate one or more of such problems and/or shortcomings by providing a new or otherwise improved flush valve assembly and toilet flush system incorporating the same.

SUMMARY OF THE INVENTION

According to a first aspect of the invention, there is provided a flush valve assembly for use in a toilet tank having at its bottom a drain opening. The flush valve assembly comprises a valve seat provided at or by said drain opening, and a valve member movable relative to the valve seat and having a valve part for, in a lower position, sealing engagement with the valve seat to hold water in said toilet tank and, in an upper position, disengagement from the valve seat to drain water from said toilet tank. The valve member includes an internal chamber for containing water to reduce buoyancy of the valve member in water, so that the valve member may descend through water to reach the valve seat for sealing engagement therewith. The valve member also has an inlet for admitting water into the chamber, and an outlet for discharging water from the chamber.

Preferably, the inlet and outlet are provided at upper and lower parts of the chamber respectively.

Preferably, the valve member has a periphery 360° around which the valve part is provided.

It is preferred that the chamber includes an internal passage for discharging water from the chamber, which passage has first and second ends and extends upwardly from its first end and then downwardly to its second end through, and acting as, the outlet of the chamber.

It is further preferred that at least the first end of the first and second ends of the passage is located at a lowermost part of the chamber.

It is further preferred that the passage turns from extending upward to extending downward at a position near an uppermost part of the chamber.

It is further preferred that the passage extends upwardly and downwardly both in a substantially linear manner.

It is further preferred that the passage has a first section extending upwardly and a second section which extends downwardly and within and along the length of the first section.

It is yet further preferred that the passage includes a relatively short transition between the first and second sections.

It is yet further preferred that the first and second sections of the passage are provided by respective outer and inner tubes, the outer tube having a closed upper end enclosing an open upper end of the inner tube.

In a preferred embodiment, the passage comprises an auto-syphon passage for discharging water from the chamber by syphon action automatically upon water in the chamber rising above the passage.

Preferably, the chamber includes a vent in communication with the ambient atmosphere.

More preferably, the vent and the inlet are provided at an upper end of the valve member.

It is preferred that the flush valve assembly includes a guide in engagement with the valve member for guiding the valve member to move upwardly and downwardly.

It is further preferred that the guide is in sliding engagement with the valve member.

It is further preferred that the guide comprises a hollow structure within which the valve member is held captive.

It is further preferred that the guide is fixed to the drain opening of said toilet tank.

According to a second aspect of the invention, there is provided a toilet flush system comprising a toilet tank, a tank refill mechanism for refilling the toilet tank with water, the aforesaid flush valve assembly used in the toilet tank, and an operating unit for operating the flush valve assembly.

Preferably, the operating unit includes a valve in a water circuit from a water source to the inlet of the valve member of the flush valve assembly for controlling supply of water into the chamber.

More preferably, the valve comprises a solenoid valve.

More preferably, the operating unit includes an actuator for lifting the valve member from the valve seat.

Further more preferably, the actuator comprises a liquid-operated actuator, and the operating unit includes a valve device for controlling supply of water to operate the actuator.

Yet further more preferably, the valve device comprises a solenoid valve.

It is preferred that the operating unit includes a manual operator for manually lifting the valve member off the valve seat, as an alternative to the actuator.

It is preferred that the operating unit includes a timer for determining the duration of operation of the actuator lifting the valve member off the valve seat, thereby determining the flush volume.

It is preferred that the operating unit includes a sensor for sensing a certain condition and in response operating the actuator.

BRIEF DESCRIPTION OF DRAWINGS

The invention will now be more particularly described, by way of example only, with reference to the accompanying drawings, in which:

FIG. 4A is a cross-sectional side view, on an enlarged scale, of a central part of the flush valve assembly of FIG. 4;

DETAILED DESCRIPTION OF PREFERRED EMBODIMENT

Figure 1:
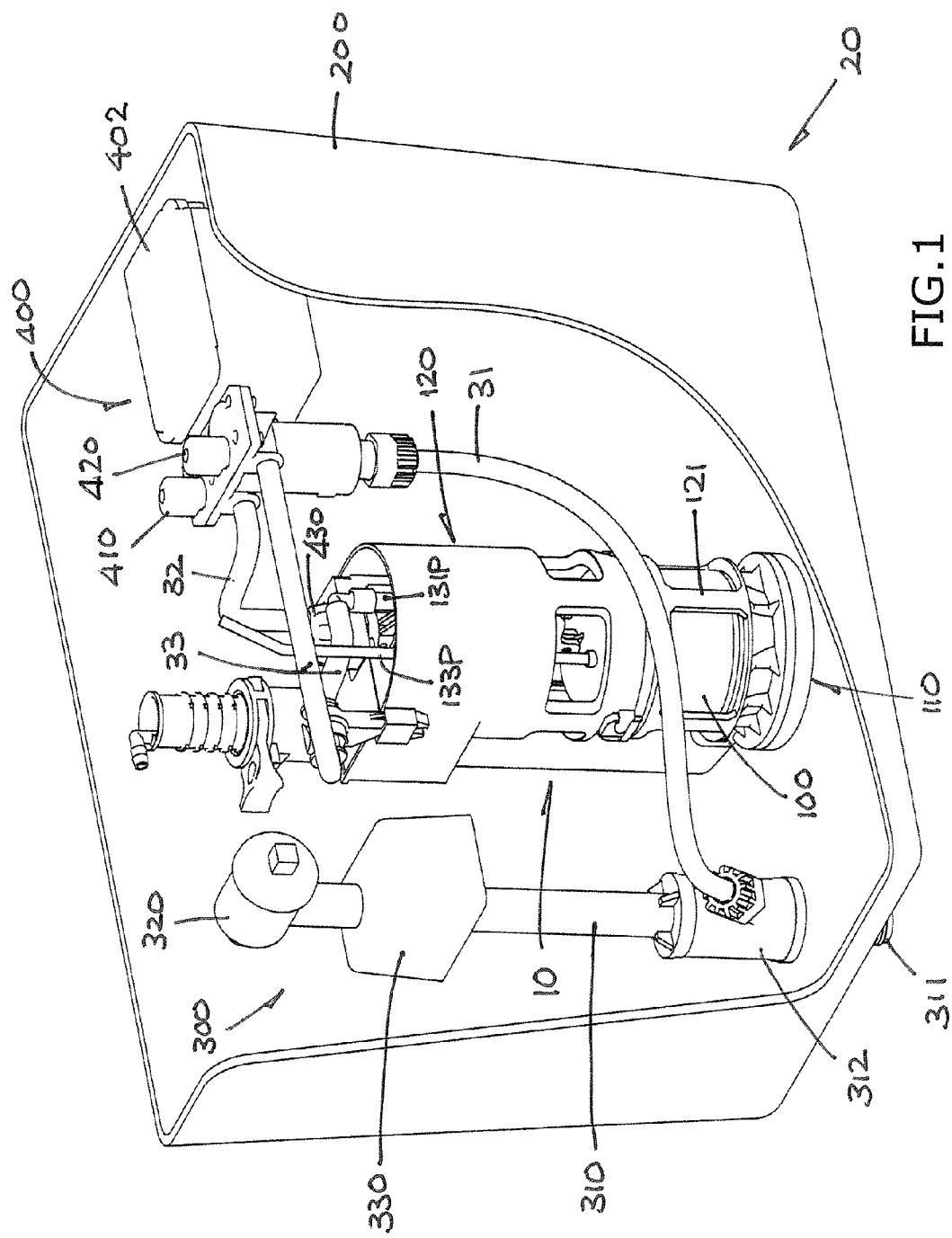
FIG. 1 is a perspective view of an embodiment of a toilet flush system which incorporates an embodiment of a flush valve assembly, both in accordance with the invention.
Figure 2:
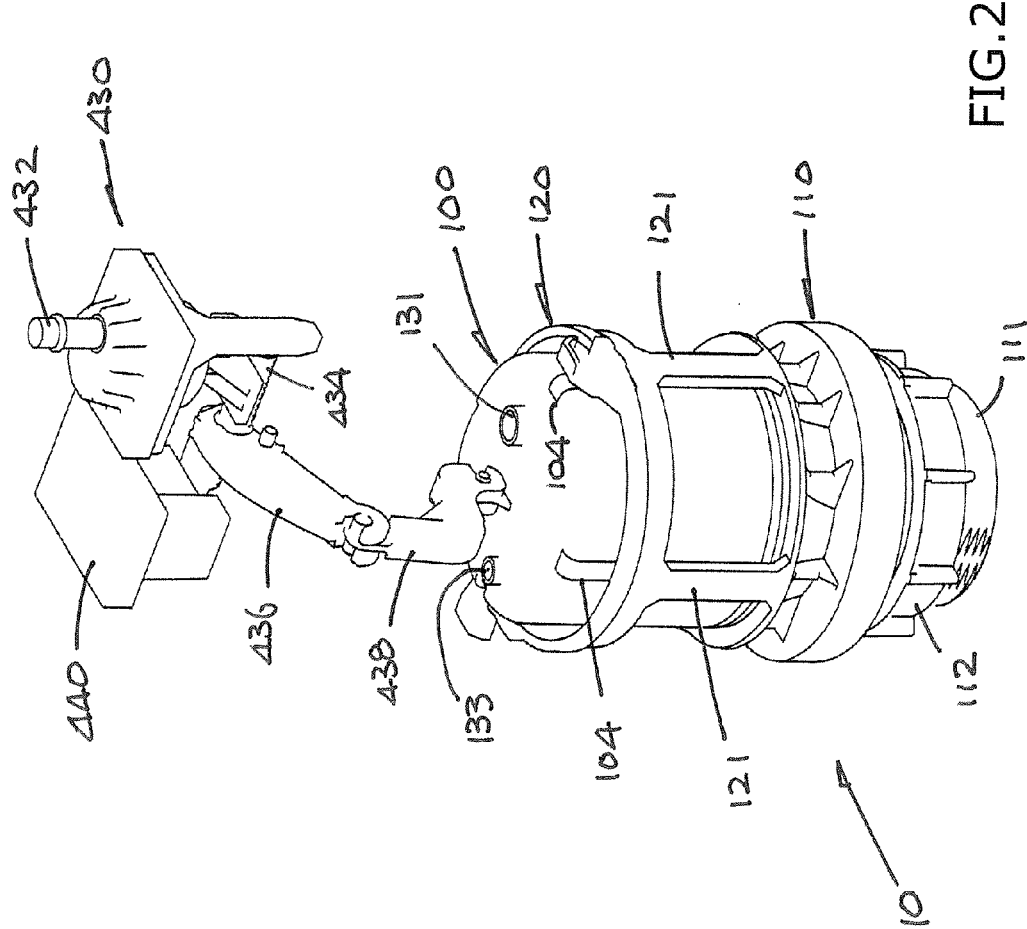
FIG. 2 is a perspective view of the flush valve assembly of FIG. 1.
Figure 3:
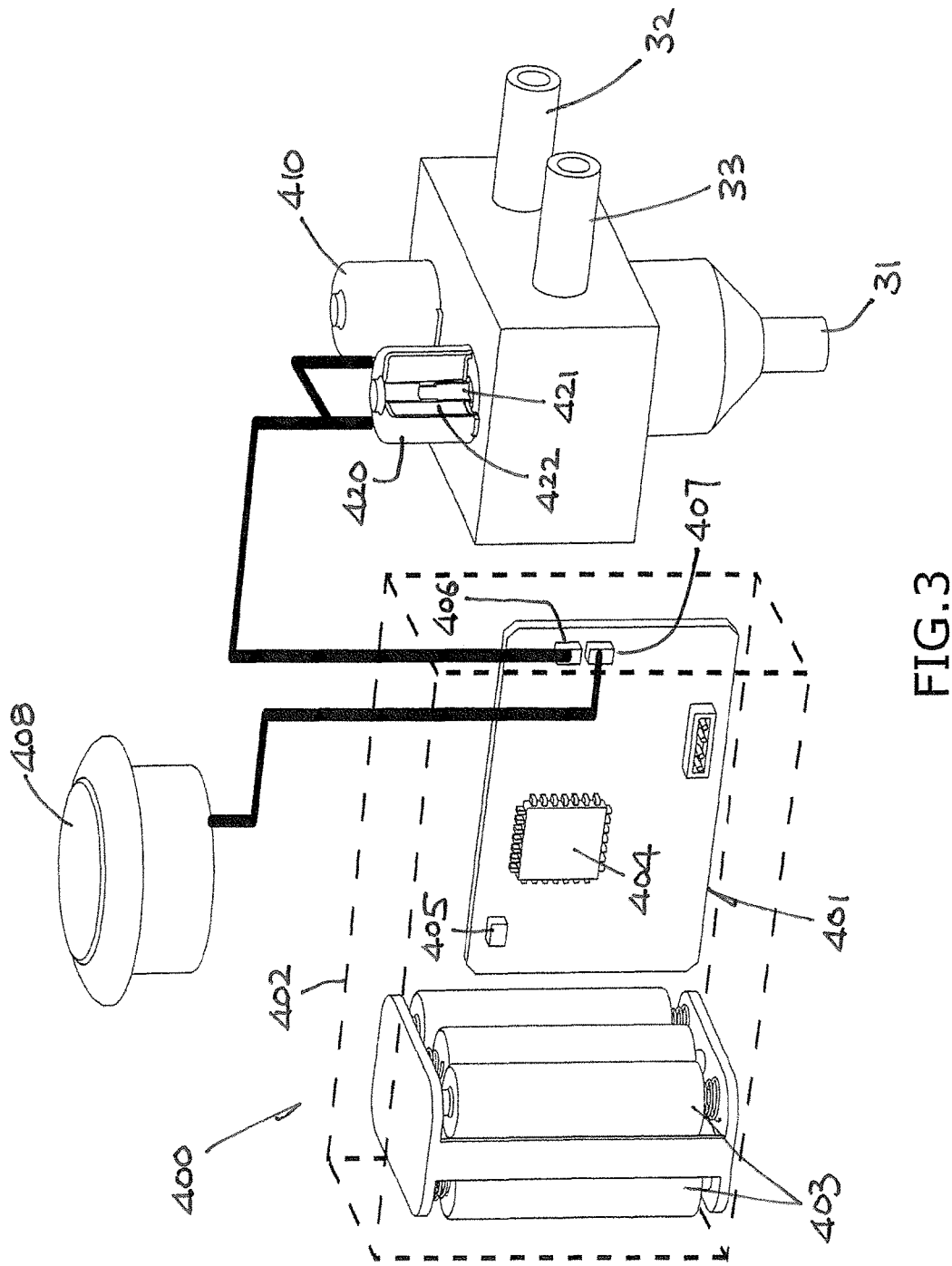
FIG. 3 is a schematic perspective view of parts of the toilet flush system of FIG. 1.
Figure 4:
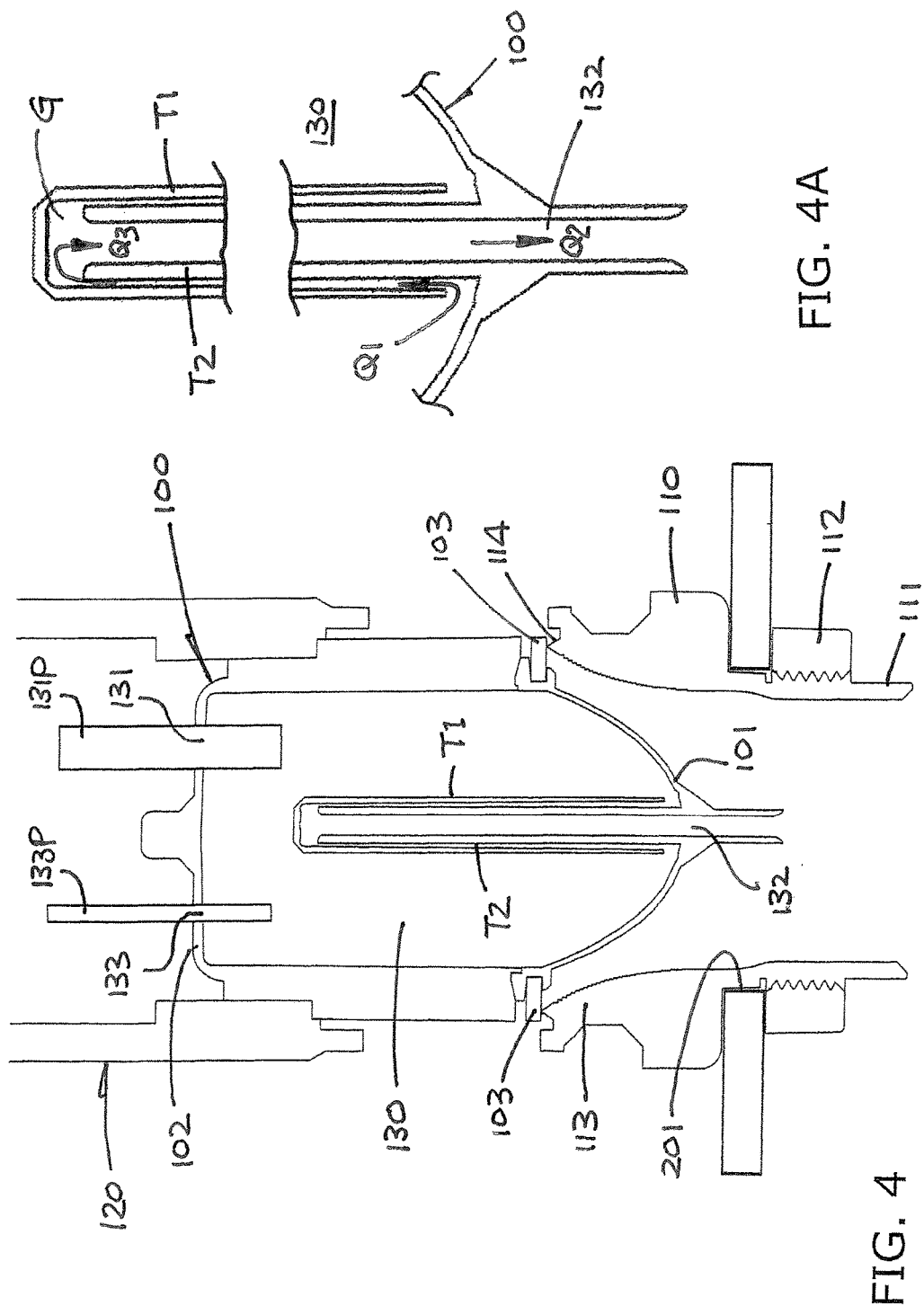
FIG. 4 is a cross-sectional side view of the flush valve assembly of FIG. 2.
Figure 5:
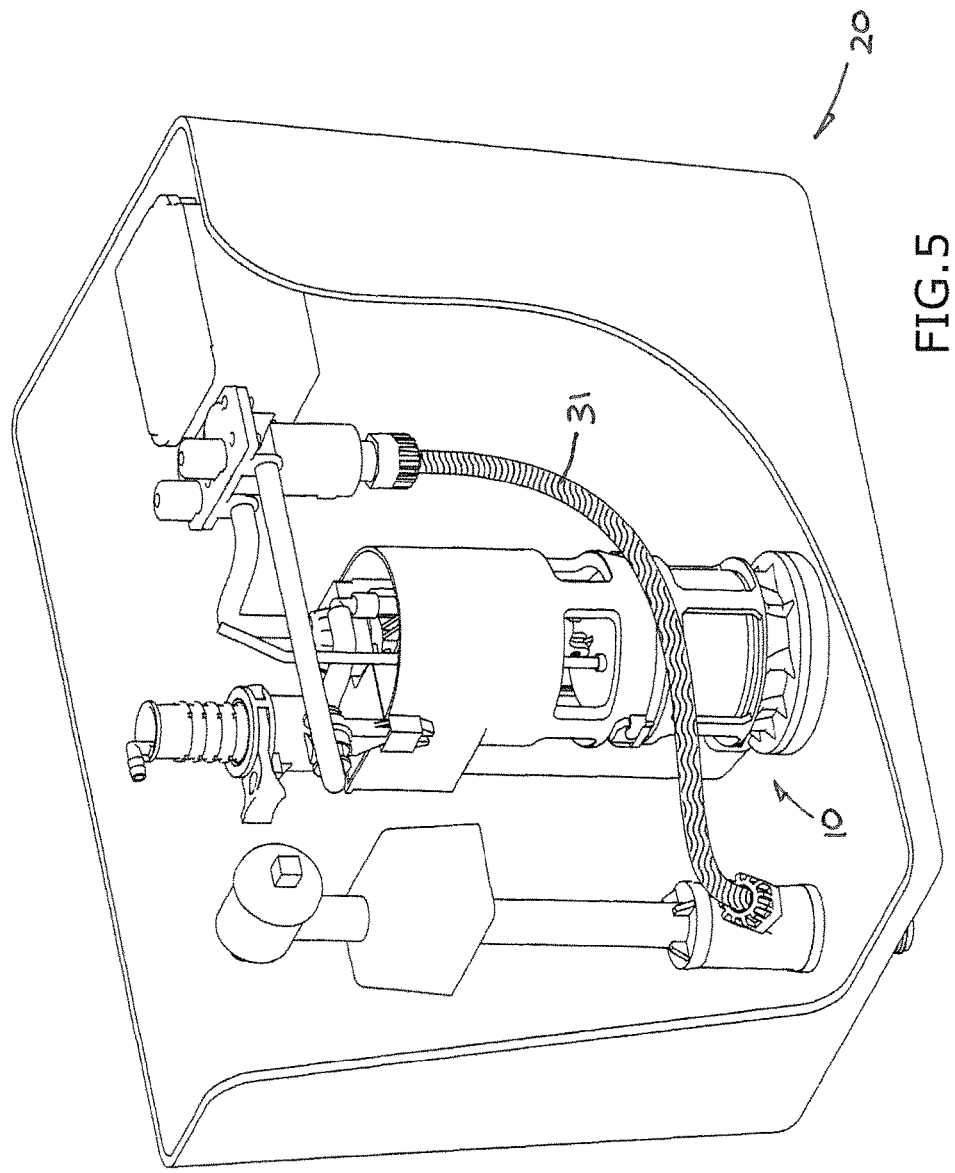
FIGS. 5 to 7 are perspective views of the toilet flush system of FIG. 1, showing it in sequential operating conditions.
Figure 6:
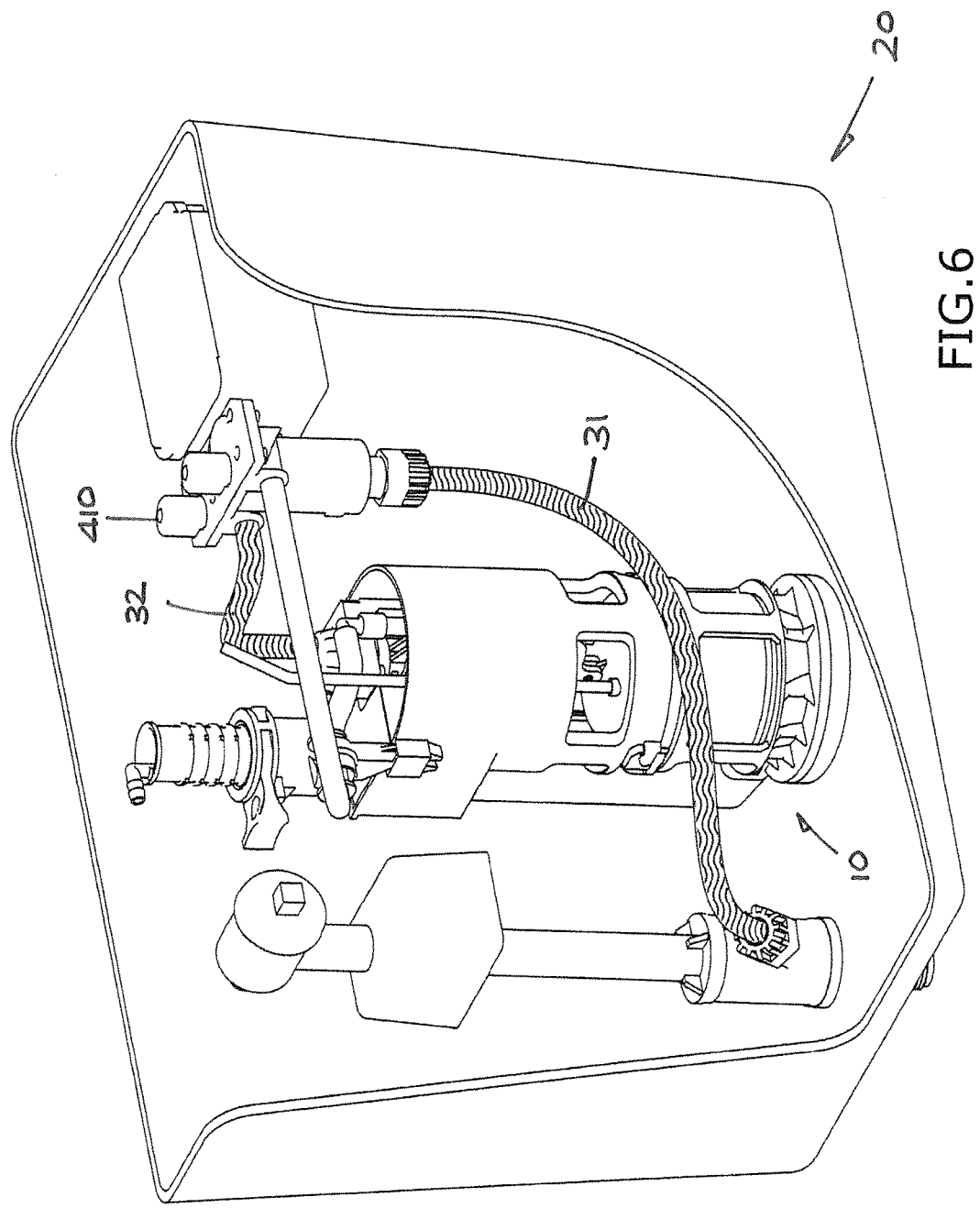
Figure 7:
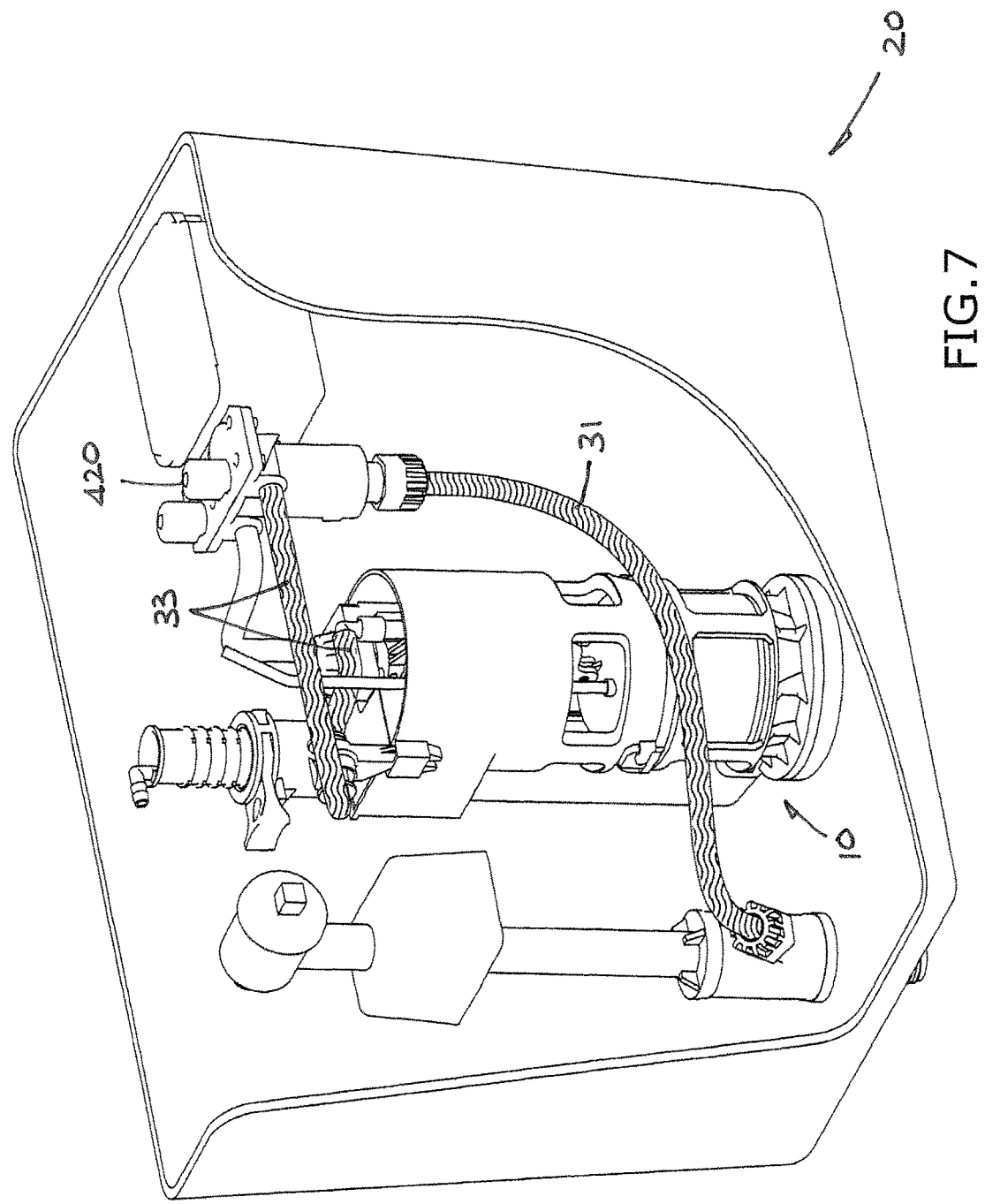

Referring to FIGS. 1 to 14 of the drawings, there are shown a flush valve assembly 10 and a toilet flush system 20 incorporating the flush valve assembly 10, both employing the invention. The toilet flush system 20 includes a toilet tank 200 which has at its bottom a drain opening 201. The flush valve assembly 10 is formed by a valve seat 110 provided at (or by) the drain opening 201, and a valve member 100 which is movable relative to the valve seat 110, together acting as a flush valve. The flush valve assembly 10 includes a generally cylindrical hollow structure 120 within which the valve member 100 is held captive, acting as a guide in sliding engagement with the valve member 100 for guiding it to move vertically upward and downward.

The valve seat 110 is a generally cylindrical member which has a lower end 111 inserted through the drain opening 201 and then secured by an external screw-threaded collar 112, and an upper end 113 having a annularly ribbed uppermost surface 114 for valve closing engagement with the valve member 100 above it.

The valve member 100 has a generally cylindrical hollow body that points downwards and within which an internal chamber 130 is defined for filling with water for operation. The valve member 100 has a pointed (or flat) lower end 101 and a flat upper end 102, and is fitted 360° around its periphery i.e. cylindrical peripheral wall with a flat rubber ring 103 that acts a valve member for cooperation with the uppermost surface 114 of the valve seat 110 to perform valve closing and opening actions.

In this particular embodiment, the guide structure 120 sits co-axially on and is integrally connected to the valve seat 110 by means of several, for example four, integral legs 121, such that the guide structure 120 is fixed to the drain opening 201. The valve member 100, which fits inside the guide structure 120, has four vertical channels 104 on and around its peripheral wall within which respective protrusions on the inner surface of the guide structure 120 slidably engage such that the valve member 100 is guided to slide vertically upwards and downwards relative to the guide structure 120.

While being slidable upwards and downwards relative to the guide structure 120, the valve member 100 has its rubber ring 103 arranged for, in a lower position (see e.g. FIG. 8), sealing engagement with the uppermost surface 114 of the valve seat 110 to hold water in the toilet tank 200 and, in an upper position (see e.g. FIG. 10), dis-engagement from the uppermost surface 114 of the valve seat 110 to drain water from the toilet tank 200.

The valve member 100 is designed to operate with its internal chamber 130 arranged to contain water for reducing the buoyancy of the valve member 100 in water, so that the valve member 100 may descend through water, before the toilet tank 200 is completely drained, to reach the valve seat 110 for sealing engagement therewith. The valve member 100 includes an inlet 131 for admitting water into the chamber 130 and an outlet 132 for discharging water from the chamber 130. The inlet 131 and outlet 132 are provided at upper and lower parts of the chamber 130 respectively and, more specifically, the corresponding upper and lower ends 102 and 101 of the valve member 100. The chamber 130 includes a vent 133 for pressure balancing, which is also provided at the upper end 102 of the valve member 100.

The inlet 131 and vent 133 are connected with respective upright rigid pipes 131P and 133P. The inlet pipe 131P is connected by means of a flexible tube 33 to a water source (i.e. the flush water supply). The vent pipe 133P has its upper end left open to the ambient atmosphere, extending to a height beyond the highest level of the water in the toilet tank 200 can get to.

The chamber 130 includes an internal passage Q (i.e. Q1+Q2+Q3) for discharging water from within the chamber 130. The passage Q has first end Q1 and second end Q2 and extends upwardly from its first end Q1 and then downwardly to its second end Q2 through, and acting as, the outlet 132 of the chamber 130. At least the first end Q1 of the first and second ends Q1 and Q2 of the passage Q is located at a lowermost part 101 (i.e. the lower end 101) of the chamber 130. To discharge substantially all water from the chamber 130, the passage Q should have its first end Q1 located practically at the lowest possible position in the chamber 130. In this particular embodiment, both of the first and second ends Q1 and Q2 of the passage Q are located at or near the lowermost part 101 of the chamber 130.

The passage Q acts as a syphon passage which serves to discharge water from within the chamber 130 by syphon action automatically upon the water in the chamber 130 rising over the passage Q, i.e. above the uppermost end or position (Q3) of the passage Q. The passage Q turns from extending upward to extending downward at a position Q3, which is the passage's uppermost position, near an uppermost part 102 (i.e. the upper end 102) of the chamber 130. Preferably, the passage Q extends upwardly and downwardly, both vertically and in a substantially linear manner.

In practice, the siphon passage Q is formed by a pair of vertical outer and inner tubes T1 and T2, with the outer tube T1 extending co-axially outside and along the inner tube T2. The inner tube T2 is open at both of its opposite upper and lower ends, and extends vertically through the outlet 132 of the chamber 130. The inner tube T2 is integrally connected with the rim of the outlet 132 such that it is erected centrally and mainly inside the chamber 130, with a relatively short lowermost section projecting downwardly from the lower end 101 of the valve member 100.

The outer tube T1 has a closed upper end which encloses the open upper end of the inner tube T2 and is connected thereto by means of spacers (not shown), such that the outer tube T1 is wholly supported by the inner tube T2. The outer tube T1 is of about the same length as the main section of the inner tube T2 inside the chamber 130.

It can be seen that the siphon passage Q has two, first and second sections which are provided by the outer and inner tubes T1 and T2 respectively, with the first section extending between the outer and inner tubes T1 and T2 and the second section extending within the inner tube T2. The first section extends upwardly, and the second section extends downwardly and within and along the length of the first section. The siphon passage Q has a relatively short transition G between the first and second sections, which is the gap between the upper ends of the outer and inner tubes T1 and T2 measured along their length. This transition G or gap should not be too long to avoid excess air trapped in the siphon passage Q, which otherwise would hinder the establishment of a siphon flow.

The toilet flush system 20 further includes a tank refill mechanism 300 for refilling the toilet tank 200 with water, and an operating unit 400 for operating, or controlling the operation of, the flush valve assembly 10.

The tank refill mechanism 300 has a generally known construction, including a water inlet tube 310 which extends upright through the bottom at a rear corner of the toilet tank 200, a normally-open valve 320 located at the uppermost end of the inlet tube 310, and a float 330 slidably mounted on the inlet tube 310. A tee fitting 312 at the bottom of the inlet tube 310 inside the toilet tank 200 supplies water to the operating unit 400 via a flexible tube 31.

Water is fed into the inlet tube 310 via a lowermost end 311 thereof, situated immediately underneath the toilet tank 200. The water travels up along the inlet tube 310 and is then discharged via the valve 320 into the toilet tank 200. The valve 320 will automatically be closed by, for example, a linkage which is operated by the float 330, upon the float 330 rising with the water to a predetermined level.

Under the control of the operating unit 400, the operation of the flush valve assembly 10 involves, at least, valve opening to trigger a flushing action, valve closing to terminate the flushing action, and flush duration control to determine the flush volume.

The operating unit 400 includes a pair of valves (or referred to as valve devices) 410 and 420, each of which is operated by an electrical solenoid and is generally known as a solenoid valve. Each solenoid valve 410/420 includes a normally-closed valve (see e.g. valve member 421 in FIG. 3) and a solenoid (e.g. designated as 422 in FIG. 3) for opening the valve for as long as it is being energized by an electrical current. The solenoid valves 410 and 420 have their inlets both connected to the tube 31 for supply of water via the inlet tube 310 and their outlets connected to the liquid-operates actuator 430 and the valve member 100 respectively by means of the tubes 32 and 33. The first solenoid valve 410 controls the supply of water to and hence operates the actuator 430. The second solenoid valve 420 controls the supply of water to and hence operates, or re-conditions, the valve member 100.

Specifically, the operating unit 400 includes the valve 420 in a water circuit, which includes the tubes 31 and 33, from a water source (i.e. the mains flush water source) to the inlet 131 of the valve member 100 of the flush valve assembly 10 for controlling supply of water into the chamber 130.

As to valve opening, the operating unit 400 includes an actuator 430 for lifting the valve member 100 from the valve seat 110 in order to trigger a flushing action. The actuator 430 is a liquid-operated actuator which has an internal piston-in-cylinder mechanism, an inlet 432 connected to the tube 32 for supply of water into the cylinder (of the piston-in-cylinder mechanism) of the first solenoid valve 410, and an output shaft 434 coupled with the piston (of the piston-in-cylinder mechanism) for rotation thereby upon the supply of water into the cylinder.

In operation, the actuator 430 converts the pressure of the mains flush water into a mechanical force which then rotates the shaft 434 and hence a first link 436, which is secured at one end to the shaft 434, and in turn pulls up, by means of a second link 438, the valve member 100 from the valve seat 110 to let the water in the toilet tank 200 flush down into the toilet.

The operating unit 400 has a number of operating modes, e.g. normal, economic (ECO) and extended modes. The operating unit 400 commences a flushing action upon receipt of a control signal which is provided directly or indirectly from a user via a trigger 408 (FIG. 3) as part of the operating unit 400. The trigger 408 may be a pressure, photoelectric or infrared sensor or any other suitable passive sensors, or a contact (e.g. capacitive) sensor or simply a mechanical switch or any other suitable active sensors.

Figure 8:
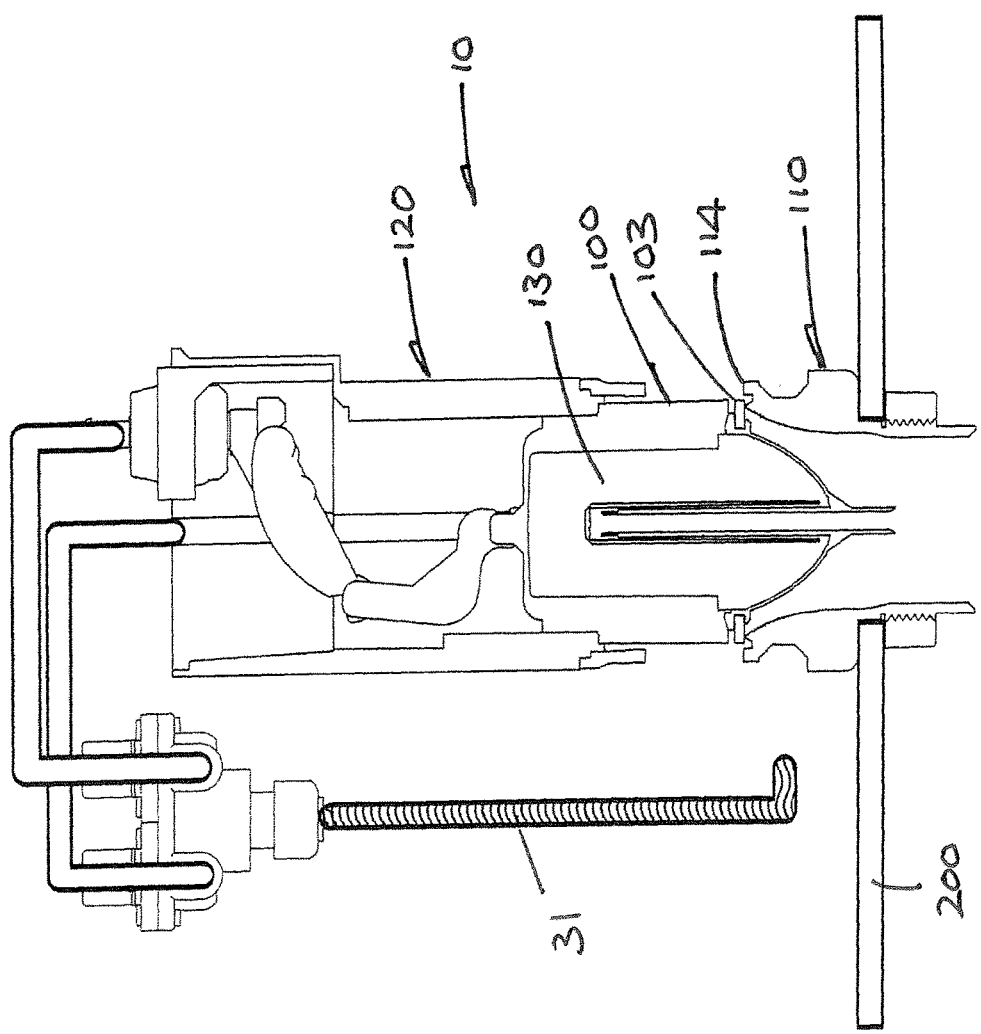
FIGS. 8 to 14 are cross-sectional side views of the flush valve assembly of FIG. 1, showing it in sequential operating conditions.
Figure 9:
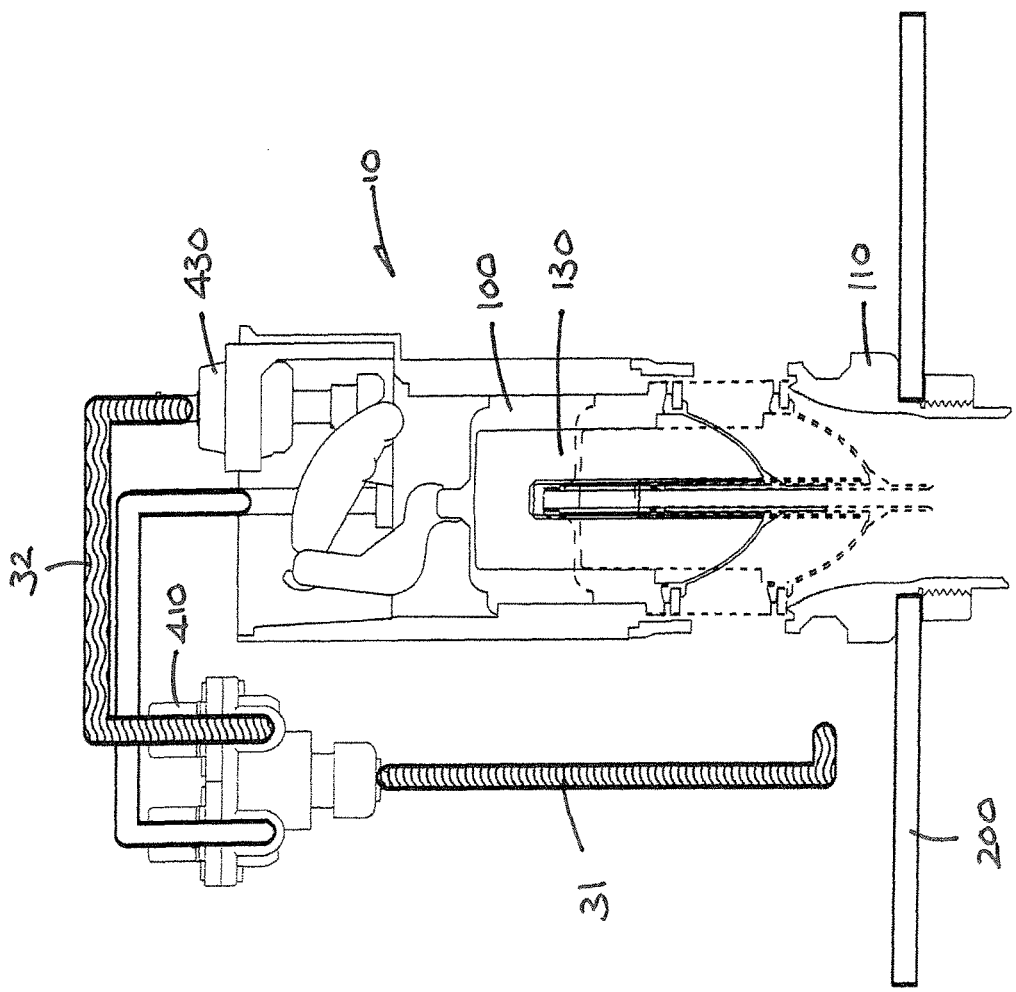
Figure 10:
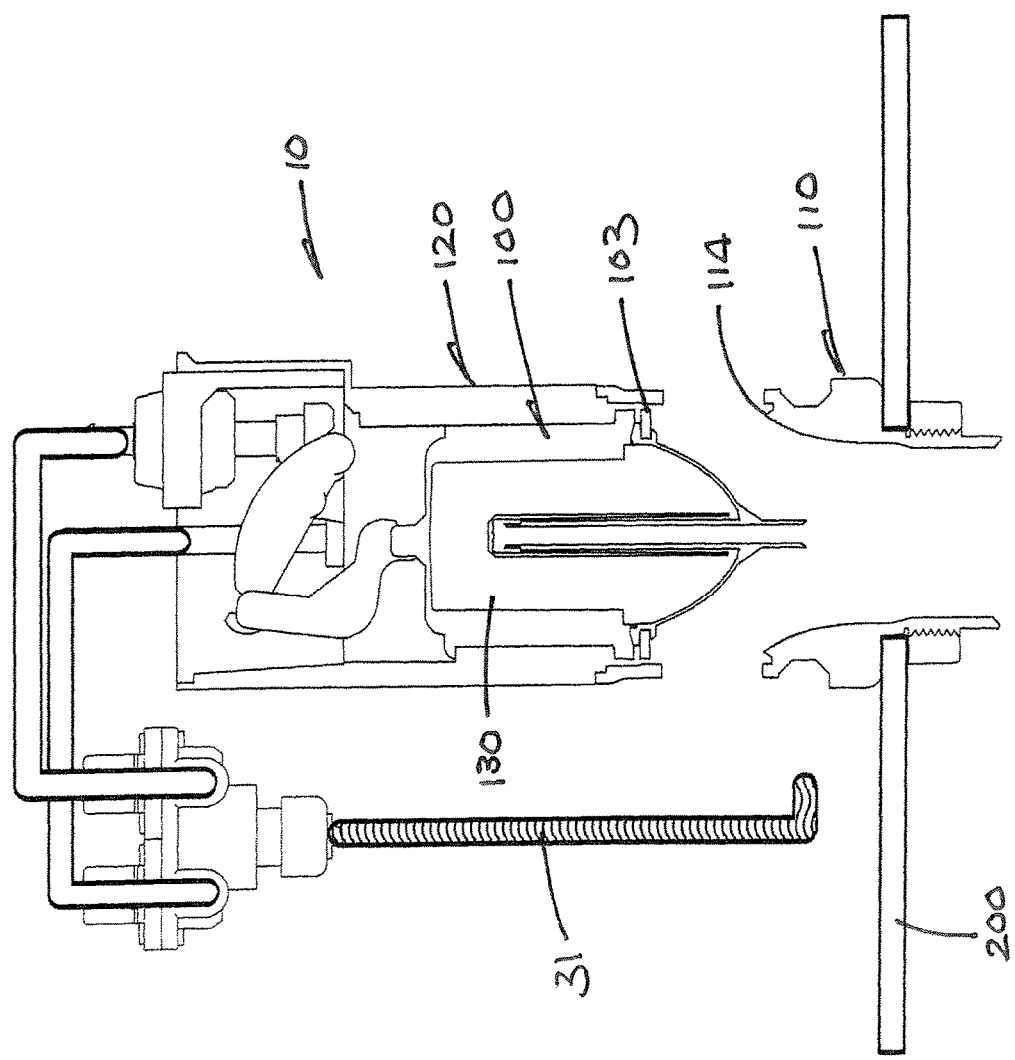

In the normal mode of operation, upon receipt of a control signal, the operating unit 400 momentarily (e.g. 100 ms as a ballpark figure) opens the first solenoid valve 410 (FIG. 9) to let the flush water pressure operate the actuator 430 to lift the valve member 100 from the valve seat 110 (from FIGS. 8 to 10). During flushing, the valve member 100 floats on the water in the toilet tank 200 while the water is being discharged. When the water lowers to a sufficiently low level, it will allow the valve member 100 to re-engage with the valve seat 110, whereupon the flush valve assembly 10 closes to terminate the flushing action. In this operation mode, nearly the full tank of water will be discharged.

In the ECO mode of operation, only a portion, e.g. one-third or half, of the water in the toilet tank 200 (i.e. a smaller flush volume than normal) will be discharged by way of early closing of the flush valve assembly 10 i.e. before the full tank of water is discharged.

Figure 11:
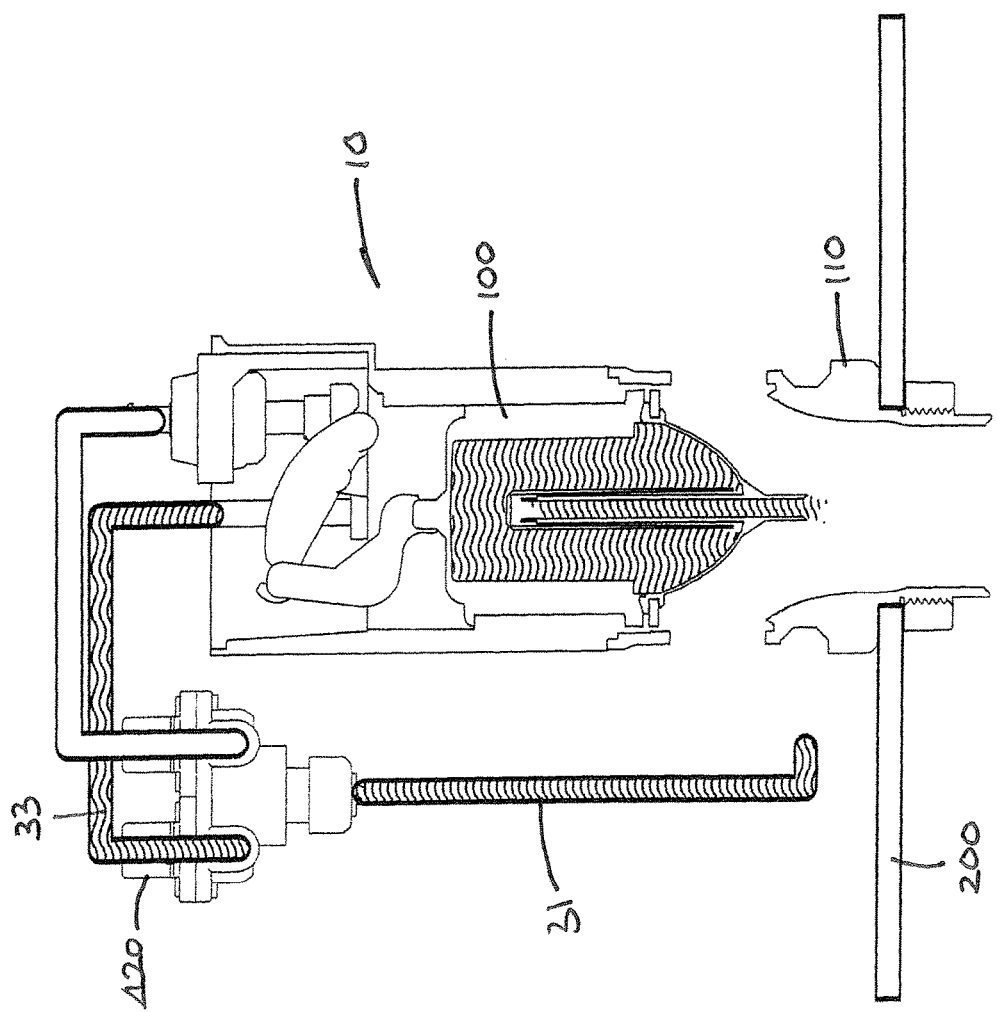

For early valve closing, at the end of a predetermined time delay (e.g. 0.5 to 1 second), after the operation of the first solenoid valve 410, the operating unit 400 opens the second solenoid valve 420 to fill the chamber 130 in the valve member 100 with water that is supplied via the tube 33 (FIG. 11). The valve member 100 will be filled up with water (i.e. in its valve chamber 130) very quickly and then descend through the water left in the tank 200, as it has already lost its buoyance due to the presence of water in it. The valve member 100 will swiftly re-engage with the valve seat 110 (FIG. 12), whereupon the flush valve assembly 10 closes to terminate the flushing action.

Figure 12:
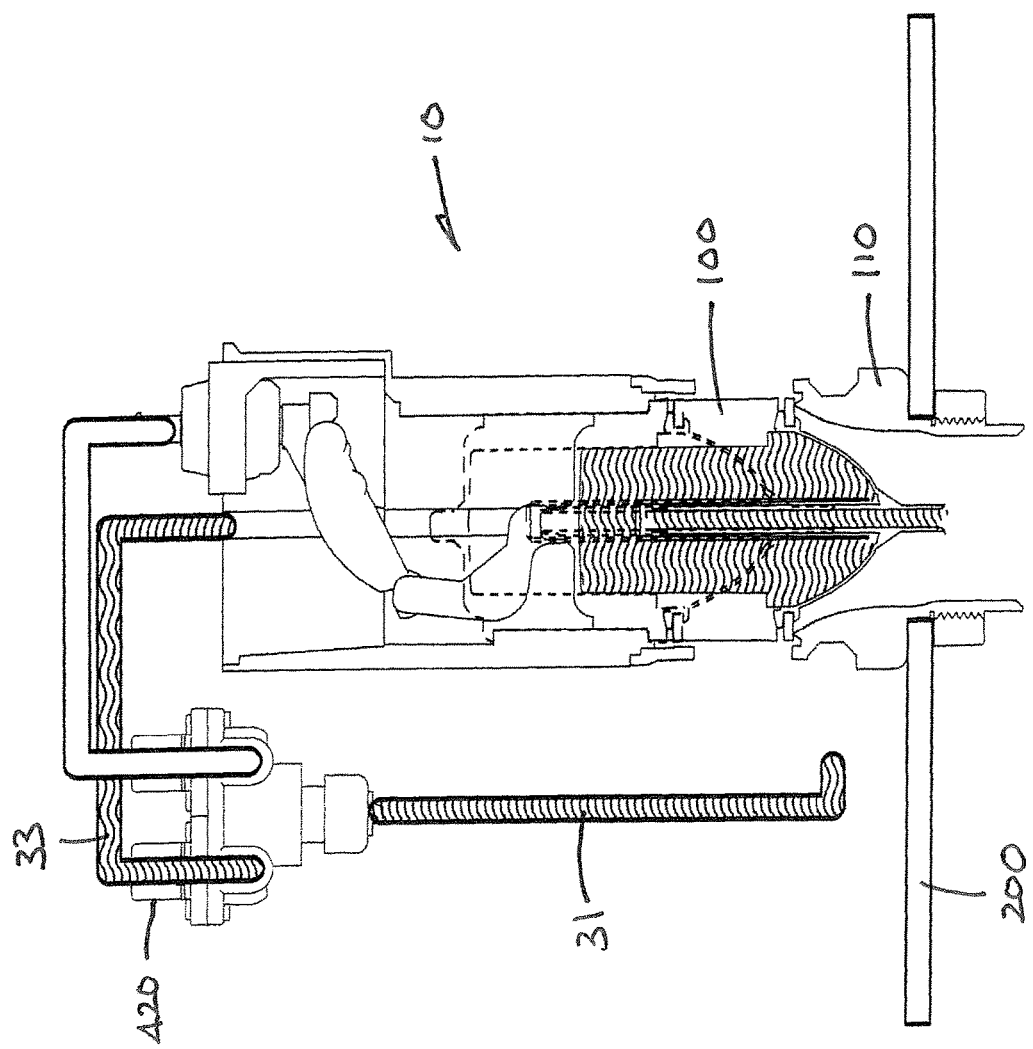
Figure 13:
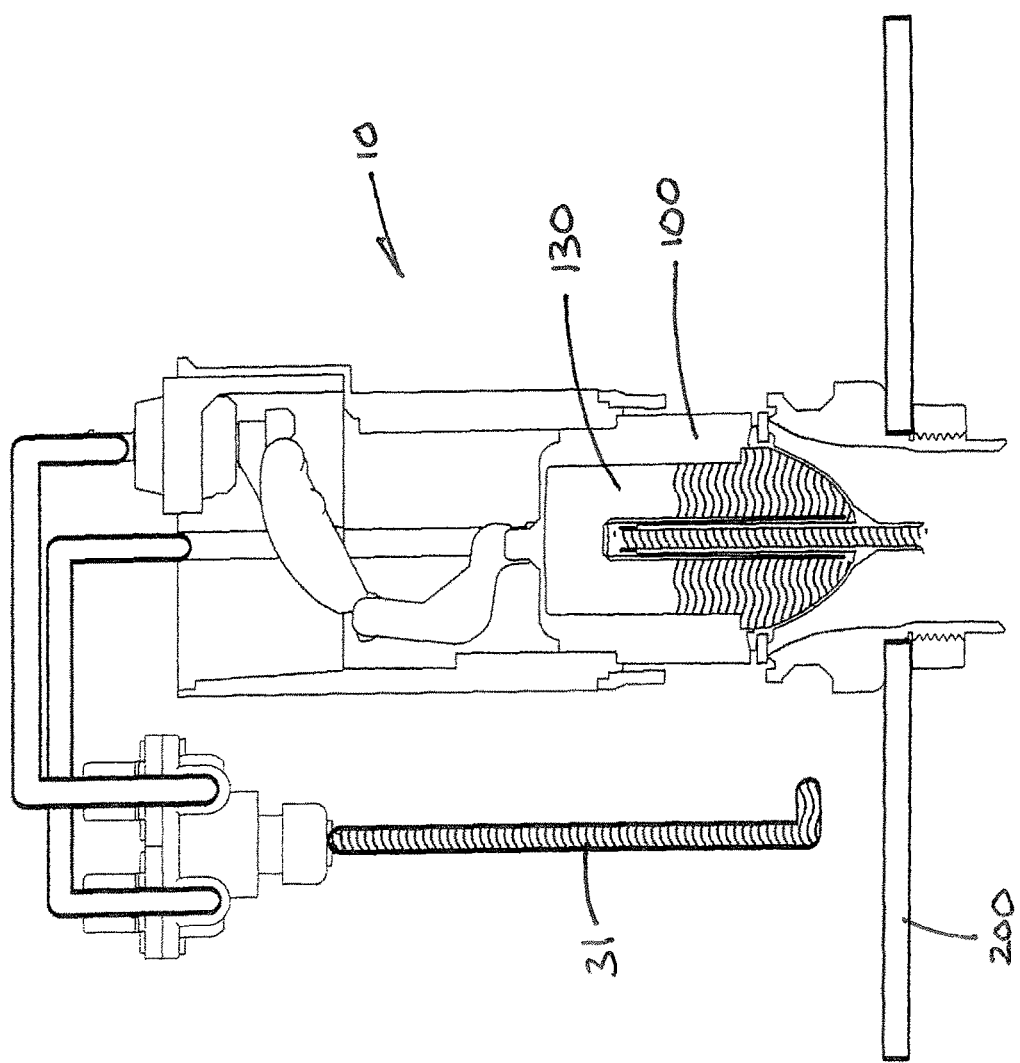
Figure 14:
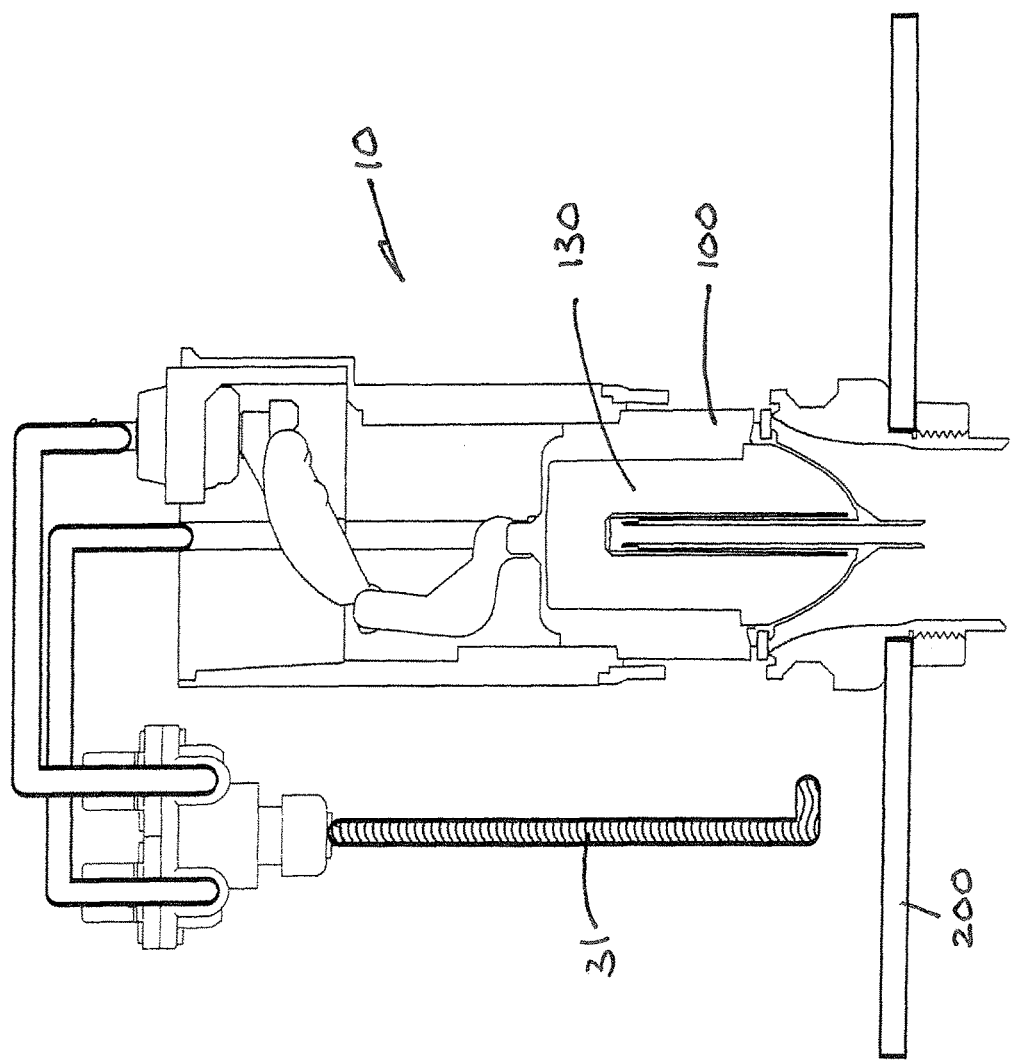

Prior to, during and until completion of the descending of the valve member 100, the solenoid valve 420 will be kept open to continue filling the valve chamber 130 with water. When the water in the valve chamber 130 rises above the uppermost end of the siphon passage Q, excessive water will overflow and be discharged via the siphon passage Q and then the chamber's outlet 132, and also the valve seat 110 and the drain opening 201, into the toilet below. In practice, as water is being refilled at a higher rate than it overflows, the chamber 130 will be kept fully filled with water (FIGS. 11 and 12).

The operating unit 400 will keep the solenoid valve 420 open until the valve member 100 re-engages with the valve seat 110 (FIG. 12), to ensure that the valve member 100 will remain fully filled with water, despite losing water by overflowing, such that it will descend (i.e. not buoyant) and close upon the valve seat 110 to terminate the flushing action.

When the operating unit 400 finally de-energizes the solenoid valve 420 to cut off the supply of water, the water in the valve chamber 130 will start to lower. Upon the water dropping to the uppermost end of the siphon passage Q, a syphon action will be automatically or self-triggered, whereupon the water in the valve chamber 130 will be discharged (FIG. 13) via the chamber's outlet 132, and also the valve seat 110 and hence the drain opening 201, into the toilet below. The syphon action will take place until the valve chamber 130 is completely drained and becomes empty again (FIG. 14), whereupon the flush system returns to the original condition (FIG. 8) pending the next flushing action.

In the extended mode of operation, the operating unit 400 enables a larger flush volume than normal, in that more than the full tank of water in the toilet tank 200 can be discharged by way of delayed closing of the flush valve assembly 10. This is achieved by way of continuous energization of the first solenoid valve 410, which then lifts and maintains the valve member 100 in a raised position for an extended time period, e.g. up to say 4 to 6 seconds. For as long as the valve member 100 is being hung, the water pre-stored in toilet tank 200 and then subsequently water replenishing from the inlet tube 310 via the valve 320 will be let down into the toilet.

The operating unit 400 further includes an electronic control circuit 401 which is housed in a case 402 hung internally on the rim of the toilet tank 200 and is powered by a set of battery cells 403. The control circuit 401 is provided by an MCU 404 for implementing control over the operation of the other functional modules which are a timer circuit 405, a driver circuit 406, a trigger circuit 407 and any other appropriate modules.

The timer circuit 405 is controllable and/or user-programmable to set the aforesaid predetermined time delay and extended time period for the corresponding modes of operation as described above, and any or all other time periods as are necessary for the operation. In the extended mode of operation, the timer 405 determines the duration of operation of the actuator 430 lifting the valve member 100 off the valve seat 110, thereby determining the flush volume in one or more quantities.

The driver circuit 406 is operable to operate, i.e. energize (open) and de-energize (close), the solenoid valves 410 and 420.

As to the trigger circuit 407, it is designed to trigger a flushing action as described above upon receipt of a control signal from an aforesaid passive sensor 408 detecting a certain user condition such as, in particular, when a user leaves the toilet seat. In response, the sensor generates and provides a control signal to the trigger circuit 407, either directly or via the MCU 404, to operate the actuator 430. The sensor 408 may alternatively be, or additionally incorporate, a mechanical or touch-sensitive switch that provides a control signal upon active operation by a user.

To enable full manual operation as desired (or as necessary in case of failure of the electrical operation, a manual operator as part of the operating unit 400 in the form of a pushbutton 440 (FIG. 2) is provided on the toilet tank 200, for use as an alternative to the automatic actuator 430. The pushbutton 440 is linked to the shaft 434 for depression to rotate the shaft 434 and hence the links 436 and 438 to manually lift the valve member 100 off the valve seat 110, thereby triggering a flushing action. Such an operation is very similar to the conventional manual flush operation.

The flush valve assembly of the present invention and a toilet flush system incorporating the same are convenient to use and versatile in terms of functions. They offer automatic operations in a number of modes and yet keep the conventional manual operation as an option or override. In particular, the flush volume may be chosen or programmed by manufacturers/technicians or users, to meet the needs of environmental protection. Battery operation is made possible by the use of the solenoid valves, which only require electrical energization momentarily or for brief periods, as the mechanical actions are driven by the pressure of the mains flush water supply.

The invention has been given by way of example only, and various other modifications of and/or alterations to the described embodiment may be made by persons skilled in the art without departing from the scope of the invention as specified in the appended claims.

The invention claimed is:

1. A flush valve assembly for use in a toilet tank having a bottom wall with a drain opening, the flush valve assembly comprising:
   a valve seat located proximate the drain opening; and
   a valve member having an axis, movable along the axis, relative to the valve seat, and having a valve part for, in a lower position of the valve member, sealing engagement of the valve part with the valve seat to hold water in the toilet tank and, in an upper position of the valve member, disengagement of the valve part from the valve seat to drain water from the toilet tank, wherein the valve member includes
      an internal chamber for containing water, wherein water contained within the internal chamber reduces buoyancy of the valve member as compared to buoyancy of the valve member when the internal chamber does not contain water, so that the valve member may descend through water outside and contacting the valve member to reach the valve seat for sealing engagement of the valve part with the valve seat,
      an inlet at an uppermost part of the internal chamber for admitting water into the internal chamber,
      an outlet at a lowermost part of the internal chamber for discharging water from the internal chamber, and
      a siphon having a siphon passage extending from the internal chamber to the outlet for flow and discharge of water from inside the internal chamber to outside the internal chamber through the outlet, wherein the siphon includes
         an inner tube projecting along the axis of the valve member, located in the internal chamber, having a lower end connected to and in fluid communication with the outlet, and an open upper end opposite the lower end of the inner tube,
         an outer tube surrounding, coaxial with, and spaced from the inner tube, and having an open lower end proximate the lowermost part of the internal chamber as a siphon passage inlet between the inner and outer tubes for flow of water from inside the internal chamber into the siphon passage, between the inner and outer tubes, and a closed upper end, spaced by a gap from the open upper end of the inner tube as part of the siphon passage, wherein, when water rises in the internal chamber above the closed end of the outer tube, water is removed from inside the internal chamber by siphon action, through the siphon passage, and discharged from the internal chamber through the outlet.

2. The flush valve assembly as claimed in claim 1, wherein the valve member has a 360° periphery around which the valve part is located.

3. The flush valve assembly as claimed in claim 1, wherein the internal chamber includes a vent in communication with the ambient atmosphere.

4. The flush valve assembly as claimed in claim 3, wherein the vent and the inlet are located at an upper end of the valve member.

5. The flush valve assembly as claimed in claim 1, including a guide in engagement with the valve member for guiding the valve member in moving along the axis.

6. The flush valve assembly as claimed in claim 5, wherein the guide is in sliding engagement with the valve member.

7. The flush valve assembly as claimed in claim 5, wherein the guide comprises a hollow structure within which the valve member is held captive.

8. The flush valve assembly as claimed in claim 5, wherein the guide is fixed to the drain opening of the toilet tank.

9. A toilet flush system comprising:
a toilet tank,
a tank refill mechanism for refilling the toilet tank with water,
the flush valve assembly as claimed in claim 1 and located in the toilet tank, and
an operating unit for operating the flush valve assembly.

10. The toilet flush system as claimed in claim 9, wherein the operating unit includes a manual operator for manually lifting the valve member off the valve seat.

11. The toilet flush system as claimed in claim 9, wherein the operating unit includes a valve in a water circuit from a water source to the inlet of the valve member of the flush valve assembly for controlling supply of water to the internal chamber.

12. The toilet flush system as claimed in claim 11, wherein the valve comprises a solenoid valve.

13. The toilet flush system as claimed in claim 9, wherein the operating unit includes an actuator for lifting the valve member from the valve seat.

14. The toilet flush system as claimed in claim 13, wherein the operating unit includes a timer for determining duration of operation of the actuator lifting the valve member off the valve seat, thereby determining flush volume.

15. The toilet flush system as claimed in claim 13, wherein the operating unit includes a sensor for sensing a certain condition and, in response to sensing the certain condition, operating the actuator.

16. The toilet flush system as claimed in claim 13, wherein the actuator comprises a liquid-operated actuator, and
the operating unit includes a valve device for controlling supply of water to operate the actuator.

17. The toilet flush system as claimed in claim 16, wherein the valve device comprises a solenoid valve.

18. A flush valve assembly for use in a toilet tank having a bottom with a drain opening, comprising:
a valve seat located proximate the drain opening; and
a valve member movable relative to the valve seat and having a valve part for, in a lower position, sealing engagement with the valve seat to hold water in the toilet tank and, in an upper position, disengagement from the valve seat to drain water from the toilet tank, wherein the valve member includes
an internal chamber for containing water to reduce buoyancy of the valve member in water, so that the valve member may descend through water to reach the valve seat for sealing engagement with the valve seat, wherein
the internal chamber includes an internal passage for discharging water from the internal chamber,
the internal passage has first and second ends and extends upwardly from the first end and then downwardly to the second end through the second end as the outlet of the internal chamber,
the internal passage comprises an auto-siphon passage for discharging water from the internal chamber by syphon action when water in the internal chamber rises above the internal passage, and
the internal passage has a first section extending upwardly and a second section extending downwardly and within and along the first section,
an inlet for admitting water into the internal chamber, and
an outlet for discharging water from the internal chamber.

19. The flush valve assembly as claimed in claim 18, wherein the inlet and the outlet are located at upper and lower parts of the internal chamber, respectively.

20. The flush valve assembly as claimed in claim 18, wherein the valve member has a 360° periphery around which the valve part is located.

21. The flush valve assembly as claimed in claim 18, wherein at least the first end, of the first and second ends of the internal passage, is located at a lowermost part of the internal chamber.

22. The flush valve assembly as claimed in claim 18, wherein the internal passage turns from extending upward to extending downward at a position near an uppermost part of the internal chamber.

23. The flush valve assembly as claimed in claim 18, wherein the internal passage extends substantially linearly, upwardly and downwardly.

24. The flush valve assembly as claimed in claim 18, wherein
the first and second sections of the internal passage include respective outer and inner tubes, and
the outer tube has a closed upper end enclosing an open upper end of the inner tube.

* * * * *